United States Patent [19]

Fussell, Jr.

[11] 4,161,878
[45] Jul. 24, 1979

[54] PRESSURE FLUCTUATION FLOWMETER

[75] Inventor: Theodore J. Fussell, Jr., Bridgewater, N.J.

[73] Assignee: Neptune Eastech, Inc., Edison, N.J.

[21] Appl. No.: 721,070

[22] Filed: Sep. 7, 1976

Related U.S. Application Data

[63] Continuation-in-part of Ser. No. 558,155, Mar. 13, 1975, abandoned.

[51] Int. Cl.² .............................................. G01F 1/32
[52] U.S. Cl. ................................................. 73/194 VS
[58] Field of Search ........................... 73/194 B, 407 R

[56] References Cited

U.S. PATENT DOCUMENTS

| | | | |
|---|---|---|---|
| 1,560,664 | 11/1925 | Cole | 73/212 |
| 3,382,715 | 5/1968 | Larham et al. | 73/194 |
| 3,564,915 | 2/1971 | Tomota et al. | 73/194 |
| 3,698,245 | 10/1972 | McNabb | 73/194 |
| 3,722,273 | 3/1973 | Yamasaki | 73/194 |
| 3,823,610 | 7/1974 | Fussell, Jr. | 73/194 |
| 3,972,232 | 8/1976 | Miller | 73/194 |
| 4,085,614 | 4/1978 | Curran et al. | 73/194 |

FOREIGN PATENT DOCUMENTS

| | | | |
|---|---|---|---|
| 2458901 | 6/1975 | Fed. Rep. of Germany | 73/194 |
| 49-114958 | 11/1974 | Japan | 73/194 |

*Primary Examiner*—Herbert Goldstein
*Attorney, Agent, or Firm*—Frederick W. Padden

[57] ABSTRACT

A fluid flowmeter includes a bluff body for producing vortex shedding free of intermittency. The body has at one end a support member for mounting in a conduit and has proximate its downstream surfaces a pair of orifices. A vibratory planar sensor, preferably ferromagnetic, is situated in a sensor chamber within the support member for vibrating in response to received pressure fluctuations. A magnetic detector is situated in proximity to the sensor for producing an electrical signal when the sensor vibrates in response to vortex shedding. Fluid in the conduit, and thus vortex shedding, is coupled from the orifices through a pair of parallel channels, which are in non-fluid-flow communication with one another, to opposite sides of the sensor. In one embodiment, the sensor comprises a diaphragm rigidly mounted along its periphery whereas in another embodiment the sensor comprises a rigid, substantially planar disc vibratorily mounted along its periphery.

40 Claims, 9 Drawing Figures

PRESSURE FLUCTUATION FLOWMETER

CROSS REFERENCE TO RELATED APPLICATIONS

This application is a continuation-in-part of application Ser. No. 558,155 filed on Mar. 13, 1975 now abandoned.

BACKGROUND OF THE INVENTION

This invention relates to flowmetering equipment and, in particular, to a flowmeter utilizing a vibratory sensor arrangement particularly suited to measure the flowrate of heterogeneous fluids, e.g., fluids such as steam having constituents in both vapor and liquid phases.

Various and sundry arrangements have been proposed by those skilled in the art which exploit the phenomenon of the Karman vortex street in order to measure fluid flowrates. More than a decade ago W. G. Bird (U.S. Pat. No. 3,116,639) devised an arrangement in which a pivoted vane-like element was positioned downstream of a vortex shedding body. Flowrate was measured by detecting the frequency of pivotal oscillation of the element. In general, the Bird arrangement, and others like it, suffered from a basic problem: intermittent vortex shedding. This problem perplexed the art until A. E. Rodely (U.S. Pat. No. 3,572,117) recognized that a suitable dimensioned bluff body, having a base surface facing fluid flow and downstream surfaces to control oscillatory flow, would produce vortex shedding free of intermittency. In this arrangement, a temperature sensitive sensor situated outside the wake generated by the bluff body detects vortex shedding and produces electrical pulses proportional to the flow rate. The sensor is mounted separately in the pipeline wall and the probe-like sensor is positioned in the low turbulence flow zone outside of the wake.

Improved versions of the Rodely bluff body flowmeter generally detect vortex shedding in the high turbulence flow zone immediately downstream of the base surface of the bluff body. Thus, in U.S. Pat. No. 3,732,731 a removable temperature sensor, on end of a rod-like holder, is located at the intersection of two channels in the bluff body. One channel extends between the downstream surfaces and the other, into which the holder and sensor are inserted, extends along the long axis of the body to the exterior of the conduit. In another arrangement, shown in U.S. Pat. No. 3,796,095 the two channels are in non-fluid-flow communication with one another, a cylindrical body containing a ferromagnetic disc in situated in the one channel which extends between the downstream surfaces, and a magnetic detector is situated in the other channel. As the disc moves, it interrupts a magnetic field causing perturbations which result in an EMF related to the flowrate. Finally, in application Ser. No. 321,532 filed on Jan. 5, 1973, and assigned to the assignee hereof, the bluff body has a pair of orifices proximate the downstream surfaces, a cylindrically shaped chamber within the body, and a shuttle ball free to move a relatively short distance within the chamber along the long axis of the bluff body in response to vortex induced pressure changes at the orifices.

While the foregoing flowmeter arrangements represent significant contributions to the state of the art, none has generally been suitable for measuring the flowrate of heterogeneous fluids: those containing constituents in both vapor and liquid phases, especially steam. In particular the high temperature of steam, often in the neighborhood of 500 degrees F., had deleterious effects on flowmeters utilizing thermistor sensors, whereas the corrosive, errosive, non-lubricating characteristics of steam tend to clog flowmeters utilizing shuttle cylinders and shuttle balls.

It is therefore one object of my invention to provide a flowmeter capable of measuring the flowrate of heterogeneous fluids.

It is another object of my invention to measure the flowrate of corrosive, errosive, non-lubricating fluids.

It is yet another object of my invention to measure the flowrate of steam.

Other schemes, which however do not utilize Rodely bluff bodies, have been suggested for controlling the condition of vortex formation. In particular, M. Tomota et al (U.S. Pat. No. 3,564,915) teach a rod-shaped object for producing vortices, the object having a transverse bore the ports of which open in the vicinity of the separation points of the boundary layers of the fluid from the object. Various types of sensing elements can be positioned in the bore. For example, in FIG. 7A, a stainless steel diaphragm 22 is used as a sensor, and at column 9, lines 66–74, it is stated that flow rate can be measured by detecting "the vibration of the diaphragm in the form of resistance variation with a strain gauge attached to the diaphragm or by converting the vibration of the diaphragm into an electric signal in the form of an electrostatic capacity change or electromagnetic change or by directly detecting the vibration of the diaphragm."

Generalized configurations such as those shown in the Tomota et al patent fail, however, to address significant design problems which render flowmeters practically useable in terms of measurement accuracy as well as field serviceability. From the standpoint of accuracy, these prior art proposals recognize neither resonant frequency problems nor fluid drainage problems associated with the sensor chamber. On the other hand, when considering fluid serviceability, the latter prior art proposals are not designed so that the most vulnerable part, the sensor, is easily replaced in the field in order to reduce flowmeter downtime.

It is therefore still another object of my invention to provide a Rodely-type flowmeter utilizing a vibratory sensor arrangement in which accuracy of measuring the flowrate of heterogeneous fluids such as steam is enhanced by facilitating liquid drain-off from the sensor.

It is another object of my invention to provide a Rodely-type flowmeter utilizing a vibratory sensor arrangement in which the sensor chamber has no resonant frequency near to the vortex shedding frequency.

It is also an object of my invention to provide a Rodely-type flowmeter utilizing a vibratory sensor arrangement in which field serviceability is enhanced by situating the sensor so that it is easily replaced in the field.

SUMMARY OF THE INVENTION

The foregoing and other objects of my invention are achieved in accordance with principles of my invention as disclosed in an illustrative embodiment of a pressure fluctuation flowmeter which advantageously is suitable for use in measuring the flowrate of heterogeneous fluids, especially steam. The flowmeter includes a Rodely-type bluff body having a base surface facing fluid flow and a pair of converging downstream surfaces and a sensor assembly coupled to a pair of orifices located in the downstream surfaces. The assembly comprises means defining a hollow interior and means bifurcating the interior to define a pair of channels, the channels having port means at a same end of the interior for admitting pressure fluctuations from the orifices into the channels. A substantially planar sensor having first and second opposite surfaces is vibratorily mounted with its first surface communicating with a first one of the pair of channels and its second surface separately communicating with a second one of the pair of channels and thereby to cause the sensor to vibrate in response to pressure fluctuations admitted to the channels. The vibrations of the sensor are detected by a means proximately located to the plane of vibration of the sensor. A feature of my invention is that the detecting means includes means in non-pressure-fluctuation communication with the pair of interior channels for sensing vibrations of a sensor. Another aspect is that the sensor comprises a ferromagnetic material on at least one of its surfaces and the sensing means comprises a magnetic detector.

In accordance with another illustrative embodiment the sensor assembly is insertably mounted within a means defining a hollow inner chamber, a portion of which communicates with pressure fluctuations at a first one of the orifices for a first surface of a substantially planar vibratory sensor. The sensor assembly comprises wall means having an exterior sealing a portion of the inner chamber and an inner segment providing a hollow interior. The assembly is equipped with means bifurcating the interior into a pair of channels, each of which has port means at a same end of the interior for admitting and withdrawing pressure fluctuations from the orifices in the bluff body. Assembly means provide an aperture between a first one of the channels and the hollow inner chamber. The sensor having first and second opposite surfaces is vibratorily mounted for communication of pressure fluctuations in a first one of the channels through the aperture and the hollow inner chamber with the first sensor surface, as well as, for separate communication of pressure fluctuations in a second one of the channels with a second sensor surface and thereby to cause the sensor to vibrate in response to the communicating pressure fluctuations.

My invention provides a Rodely sensor assembly in combination with a vortex shedding bluff body for generating streets of pressure fluctuations in a fluid flow through a conduit. The assembly comprises means defining a hollow interior and means bifurcating the interior into a pair of channels each of which comprises port means at a same end of the interior for communicating pressure fluctuations from an individual one of the generated streets through orifices in the downstream surfaces of the bluff body. In addition, the assembly includes a substantially planar vibratory sensor having first and second opposite surfaces, and means mounting the sensor for communicating pressure fluctuations in a first one of the channels with the first sensor surface and for separately communicating pressure fluctuations in a second one of the channels with the second sensor surface and thereby to cause the sensor to vibrate in response to the communicating pressure fluctuations and at a frequency related to the flowrate through the conduit. The vibratory frequency is sensed by a detector which advantageously is arrangeable in non-fluid communication with the bifurcated channels and which is selectably a magnetic detector for detecting vibratory movement of a ferromagnetic material of or on at least one of the sensor surfaces.

Another feature is the provision of a Rodely bluff body having an orifice adjacent each downstream surface in combination with means defining a first hollow conduit, means defining a second hollow conduit having a portion thereof substantially parallel to the first conduit defining means, the first and second conduits having exterior ports substantially parallel to one another for admitting pressure fluctuations from separate ones of the orifices into the conduits in the same longitudinal direction, a substantially planar vibratory sensor having first and second surfaces, and means mounting the sensor for communicating pressure fluctuations in the first conduit with the first sensor surface and for separately communicating pressure fluctuations in the second conduit with the second sensor surface.

Accordingly, my invention comprises a Rodely bluff body having an orifice adjacent each downstream surface in combination with a substantially planar vibratory sensor with first and second opposite surfaces mounted in a hollow inner chamber, means for bifurcating the inner chamber into two channels for admitting pressure fluctuations from the orifices in the same longitudianl direction toward one of the sensor surfaces and through the two channels and means cooperating with the bifurcating means for communicating pressure fluctuations in a first one of the channels with a first sensor surface and for separately communicating pressure fluctuations in a second one of the channels with a second sensor surface.

In accordance with another specific illustrative embodiment of my invention, a flowmeter comprises a Rodely-type bluff body for producing vortex shedding free of intermittency. The body has at one end a support member for mounting in a conduit and has proximate its downstream surfaces a pair of orifices. A vibratory substantially planar sensor, preferably ferromagnetic, is vibratorily mounted in a sensor chamber within the support member, and a magnetic detector is situated in proximity to the sensor for producing an electrical signal when the sensor vibrates in response to vortex shedding. Fluid in the conduit, and thus vortex shedding, is coupled from the orifices through a pair of channels, which are in non-fluid-flow communication with one another, to opposite sides of the sensor.

In one embodiment the sensor comprises a flexible diaphragm rigidly mounted along its periphery and in another embodiment the sensor comprises a rigid, substantially planar disc vibratorily mounted along its periphery. In the former case, one surface of the diaphragm may be made of or include a ferromagnetic material. In the latter case, the disc may have a raised central portion on which a ferromagnetic member is mounted.

In a preferred embodiment, the bluff body has in its end face near the support member a cavity which extends inwardly along the long axis of the body and which forms the orifices in its downstream surfaces. The sensor is mounted at one end of a cylindrical housing the interior of which is bifurcated by a partition to form the two channels. Cut-outs in the housing wall at its other end are in registry with the two orifices when the housing is inserted into the cavity in the bluff body. One of the channels couples fluid from one of the orifices to the side of the sensor interior to the housing. The other channel couples fluid from the other orifice through an aperture in the housing wall to the side of the sensor exterior to the housing, i.e., to the sensor chamber.

In order to enhance measurement accuracy, the sensor chamber, as well as the two channels, are designed so that their resonant frequencies are remote from the vortex shedding frequency. In addition, by positioning the sensor out of the main stream of fluid flow, the deleterious effects of corrosive, errosive, nonlubricating fluid, such as steam, are considerably ameliorated. Drainage problems associated with hetergeneous liquids, such as steam, especially saturated steam, are alleviated by the configuration of the sensor chamber and channels, particularly when the bluff body is mounted vertically with the sensor chamber at the top. To facilitate field serviceability, the magnetic detector is situated in a removable head cap which is secured to the support member but which protrudes exterior to the conduit. Removal of the head cap exposes the sensor chamber, and hence the sensor for repair or replacement without requiring significant flowmeter downtime.

BRIEF DESCRIPTION OF THE DRAWING

These and other objects of my invention, together with its various features and advantages, can be readily understood from the following more detailed description taken in conjunction with the accompanying drawing, in which.

DETAILED DESCRIPTION

Figure 1:
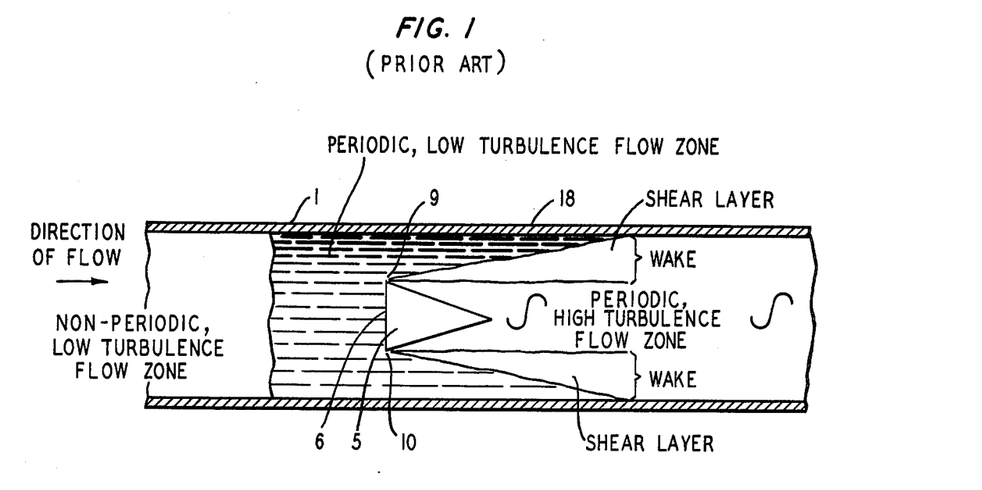
FIG. 1 shows schematically the flow zones created by a Rodely-type bluff body in a conduit.

Before discussing my invention in detail, it will be helpful to review briefly the manner in which a Rodely bluff body interacts with fluid flowing in a conduit. As shown in FIG. 1, a bluff body 5 having a triangular cross section is mounted along a diameter of pipe 1. A facing surface or base 6 of body 5 interacts with fluid flowing in the pipe 1 to produce separate streets of pressure fluctuations about and downstream of body 5. Thus, an oscillating wake; i.e., that region bounded by and including the shear layers which separate the periodic, high turbulence flow zone behind body 5 from the periodic, low turbulence flow zone outside thereof. The wake zone commences proximate the sharp edged corners 9 and 10 of body 5 and spreads downstream from body 5 until it fills the entire pipe 1. In the upstream direction from body 5, the signals detectable in front of body 5 get progressively weaker upstream and become almost completely buried in the turbulent flow fluctuations at approximately one bluff body length upstream from body 5. In Rodely U.S. Pat. No. 3,572,117 a probe-like sensor is typically mounted in the pipe wall at location 18 in the periodic, low turbulence flow zone outside of the wake.

To achieve nonintermittency in the oscillating fluid flow the Rodely patent teaches that the ratio of the axial length of bluff body 5 to the height of base 6 is advantageously between 1 and 2, and the ratio of the height of base 6 to the inner diameter of pipe 1 is advantageously between 0.15 and 0.4. Moreover, a dimensional length between a frontmost surface of the base 6 to its sharp corner edges with respect to that of the height of the base is of a ratio of 0.3 or less.

These criteria are advantageously satisfied in my invention, a Rodely-type flowmeter incorporating the sensor arrangements shown in FIGS. 3-9.

Figure 2:
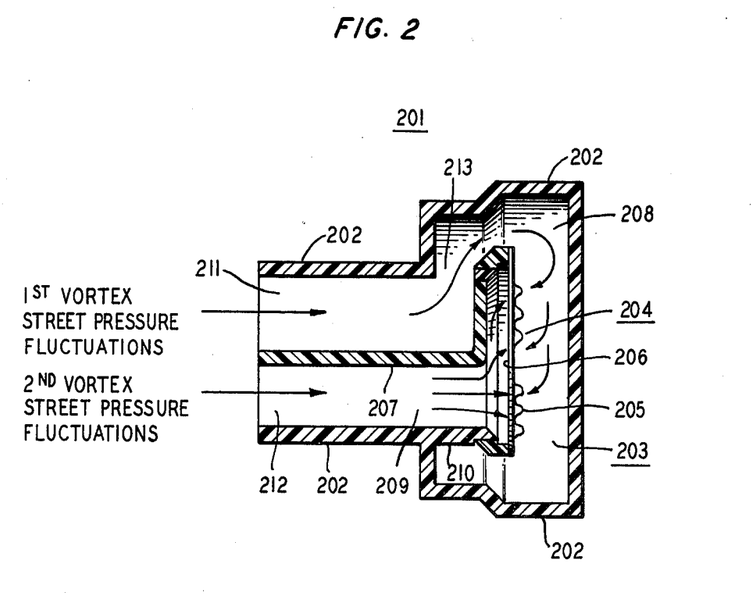
FIG. 2 shows a basic sensor assembly structure illustrating principles of my invention.

Before discussing the specific exemplary Rodely-type flowmeters, it is desirable to explain fundamental principles of my invention with respect to a basic pressure fluctuation sensor structure as depicted in FIG. 2 by way of example. FIG. 2 shows an assembly 201 comprising wall means 202 defining a hollow interior chamber 203. A substantially planar vibratory sensor such as diaphragm 204, illustratively of a ferromagnetic material, is equipped with first and second opposite surfaces 205 and 206. A partition member 207 bifurcates the interior chamber 203 into two channels 208 and 209. Diaphragm 204 is illustratively mounted by a means 210 and with respect to the bifurcating partition member 207 so that pressure fluctuation in the first channel 208 communicates exclusively with the first diaphragm surface 205 and pressure fluctuations in the second channel 209 communicate exclusively with the second diaphragm surface 206. Pressure fluctuations from first and second vortex streets produced by a Rodely vortex generating body enter the first and second channels 208 and 209 through port devices 211 and 212 and, advantageously in a same longitudinal and parallel direction toward diaphragm surface 206. An aperture 213 enables admitted pressure fluctuations in channel 208 to communicate with the diaphragm surface 205. Accordingly, pressure fluctuations in channels 208 and 209 cause the diaphragm 204 to vibrate at a frequency related to the flowrate of a fluid producing the fluctuations. Such vibrations are detected in accordance with my arrangement by a detector means (not shown in FIG. 2) which advantageously is in non-fluid communication with both channels 208 and 209 and is illustratively a magnetic detector.

Figure 5:
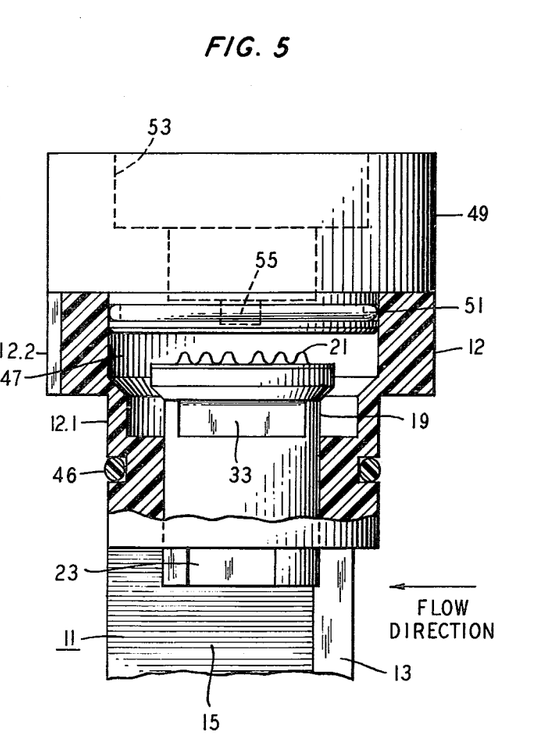
FIG. 5 is a cut-away view of a flowmeter in accordance with an illustrative embodiment of my invention with the diaphragm housing in place.
Figure 6:
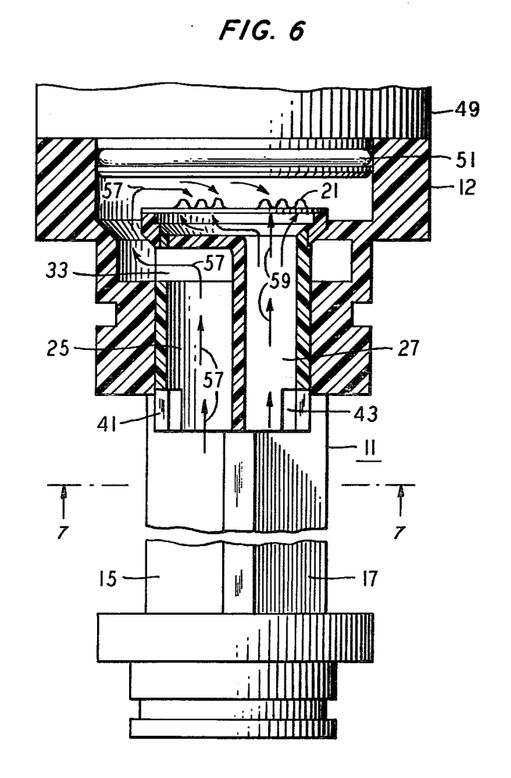
FIG. 6 is similar to FIG. 4 with the diaphragm housing in section to shown the direction of fluid flow in the channels and in the sensor chamber.
Figure 7:
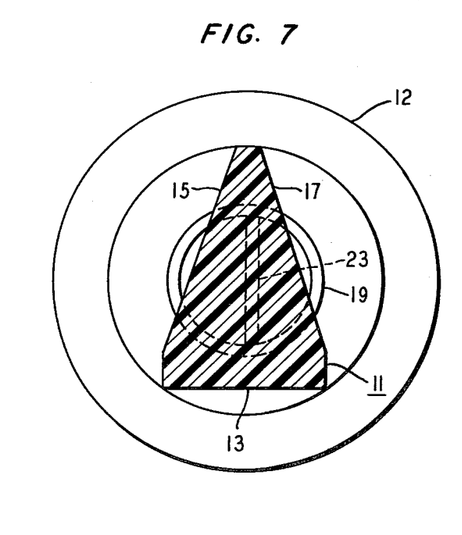
FIG. 7 is an end view taken along line 6—6 of FIG. 5.
Figure 8:
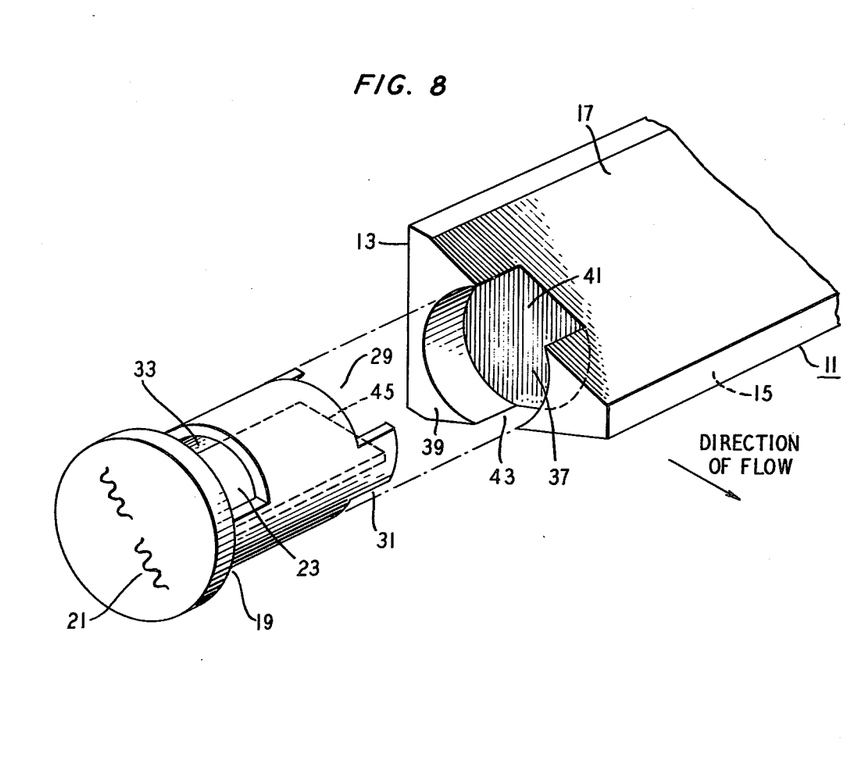
FIG. 8 is an exploded pictorial view showing how the diaphragm housing fits into the bluff body.

Turning now to FIGS. 3-8, a flowmeter comprising a Rodely-type bluff body in combination with a specific exemplary diaphragm sensor assembly is shown. A Rodely bluff body 11 as shown in FIGS. 7 and 8 has a support member 12 and is mounted along a diameter of a conduit (not shown) and between the walls thereof. Preferably the bluff body 11 comprises a base surface 13 disposed normal to the direction of fluid flow in the conduit and a pair of converging downstream surfaces 15 and 17. The cross section of bluff body 11 therefore, as shown in FIGS. 7 and 8, is substantially triangular. In order to detect oscillatory fluid motion (vortex shedding) produced by the bluff body, my flowmeter is provided with a sensor arrangement including a substantially planar vibratory sensor.

Figure 3:
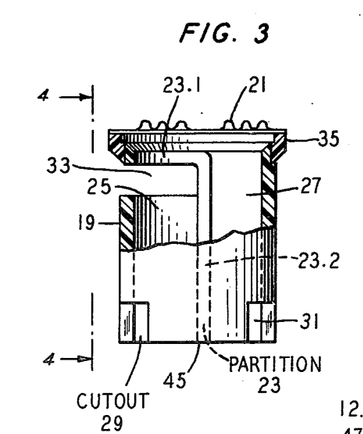
FIG. 3 is a cut-away view, partially in section, of a diaphragm housing in accordance with one embodiment of my invention.
Figure 4:
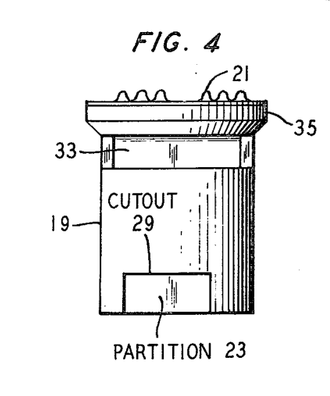
FIG. 4 is a side view taken along lines 3—3 of FIG. 2.

Illustratively, the sensor arrangement comprises a cylindrical housing 19 and a flexible diaphragm 21 rigidly mounted along its periphery to one end of the housing as shown in FIGS. 3 and 4. The hollow interior of the housing 19 is bifurcated by an L-shaped partition 23 which forms a pair of fluid channels 25 and 27 in non-fluid-flow communication with one another. At the other end of the housing 19 there are a pair of rectangular cut-outs 29 and 31 which, as will be described hereinafter, permit fluid flow into channels 25 and 27, respectively. At the end of the housing 19 which carries the diaphragm 21 there is an aperture 33 which, as will be described hereinafter, places channel 25 in fluid flow communication with the side of diaphragm 21 exterior to housing 19. Channel 27, on the other hand, is in fluid flow communication with the side of diaphragm 21 interior to housing 19. Note that the foot 23.1 of L-shaped partition 23 is affixed to the housing wall at a point above aperture 33 so that fluid flowing in channel 25 cannot reach the side of diaphragm 21 interior to housing 19.

In an illustrative example, the diaphragm housing 19 is manufactured of stainless steel. The diaphragm 21 is ferromagnetic (KEARFLEX #100 manufactured by Kearflex Corporation of Warwick, Rhode Island) and is electron beam welded to a head cap 35 which is welded in the same manner to the cylindrical walls of the housing. Typical dimensions in inches are as follows: overall housing length 1.15, housing inside diameter 0.64, cut-outs 29 and 31 measure 0.20 by 0.47, and aperture 33 measures 0.19 by 0.64.

As shown in FIG. 8, housing 19 fits snuggly into a cavity 37 formed by drilling a bore into one end face 39 of bluff body 11. The bore breaks through each of the downstream surfaces 15 and 17 to form a pair of rectangular orifices 41 and 43, respectively. When housing 19 is inserted into cavity 37, rectangular cut-outs 29 and 31 are substantially in registration with orifices 41 and 43. Moreover, the bottom 45 of the leg 23.2 of partition 23 is flush with the end of housing 19, so that when the housing is inserted into cavity 37 the bottom 45 of the partition abuts the bottom surface of cavity 37.

In an illustrative example, the outside diameter of support member 12 is about 1.86 in., the end face (cross-section) of the bluff body 11 measures about 1.75 in. at its base and 0.31 in. at its apex. The bore used to form cavity 37 is about 0.75 in. in diameter.

Turning now to FIGS. 5 and 6, it can be seen that support member 12 has a first portion 12.1 to which bluff body 11 is attached and a larger diameter second portion 12.2 which is situated exterior to the conduit (not shown). An O-ring 46 provides a fluid tight seal between portion 12.1 and the conduit. First portion 12.1 has a bore into which housing 19 fits snuggly. Second portion 12.2 has a sensor chamber 47 into which the housing 19 extends so that diaphragm 21 is disposed in the chamber 47. Aperture 33 couples chamber 47 in fluid flow communication with channel 25.

Chamber 47 is closed via a head cap 49. O-ring 51 provides a fluid tight seal between the two. Head cap 49 has a threaded, stepped opening 53 into which a magnetic pick-up (not shown) is inserted. The sensitive portion of the detector is positioned in a recess 55 so that it is as close to the (ferromagnetic) diaphragm 21 as practical.

In an illustrative example, the bottom of the head cap 49 is separated from the top of diaphragm 21 by only 0.10 in. Other typical dimensions in inches are: outside diameter of head cap 49 and portion 12.1 about 1.88; and inside diameter of chamber 47 about 1.32.

It is to be understood that the illustrative examples given above for various components are taken from a single flowmeter designed in accordance with one embodiment of my invention and are not intended to limit the scope thereof. The resonant frequency associated with sensor chamber 47 and channels 25 and 27, having the dimensions given above is outside the typical range of vortex shedding frequencies of steam flowing in a conduit.

The operation of my invention will now be described with reference to FIG. 6. Fluid, such as saturated steam at 500 degrees F. and 681 psia, flows in a direction out of the paper, that is, generally normal to the base surface of bluff body 11. Vortex shedding results, as described in Rodely U.S. Pat. No. 3,572,117, at the edges of the base surface and spreads along the downstream surfaces 15 and 17 and hence into orifices 41 and 43. Thus, as shown by arrows 57 and 59, fluid flows through orifices 41 and 43 and channels 25 and 27, respectively, to opposite sides of diaphragm 21. In particular, fluid flows into orifice 41, through channel 25 and aperture 33, into chamber 47 to the side of diaphragm 21 exterior to housing 19. On the other hand, as shown by arrows 59, fluid also flows into orifice 43, through channel 27 to the side of diaphragm 21 interior to housing 19.

Vortex induced pressure changes in the fluid on opposite sides of the ferromagnetic diaphragm 21 cause it to vibrate at a frequency related to the flow rate of the fluid. This vibration of the diaphragm perturbs a magnetic field of the detector which generates an EMF proportional to the flowrate.

I have found that my flowmeter is particularly suited to measuring the flowrate of steam, especially saturated steam which has a considerable liquid content. From the standpoint of measurement accuracy, liquid accumulation on the diaphragm would be detrimental. However, if my flowmeter is mounted vertically, with the diaphragm at the top, then the design of the chamber and channels facilitates drainage of liquid (water) which would interfere with signal detection. Moreover, in my flowmeter the diaphragm is located outside the main stream of fluid flow to reduce the corrosive, errosive effects of steam. From the standpoint of field serviceability, the diaphragm 21 is readily replaced in the field by merely unscrewing head cap 49 and removing housing 19. This feature is also made possible because there is no need to hermetically seal the diaphragm, mechanical force and the O-ring 51 are sufficient.

It is to be understood that the above-described arrangements are merely illustrative of the many possible specific embodiments which can be devised to represent application of the principles of my invention. Numerous and varied other arrangements can be devised in accordance with these principles by those skilled in the art without departing from the spirit and scope of the invention. In particular, the diaphragm may be attached to its head cap by brazing as well as welding or it may be restrained by a snap ring or spring. Alternatively, the diaphragm may be mounted between resilient O-rings or an elastomeric ring may be molded to a stiff disk. Moreover, an elastomeric membrane with an encapsulated metal exciter may be used in lieu of a ferromagnetic diaphragm.

Figure 9:
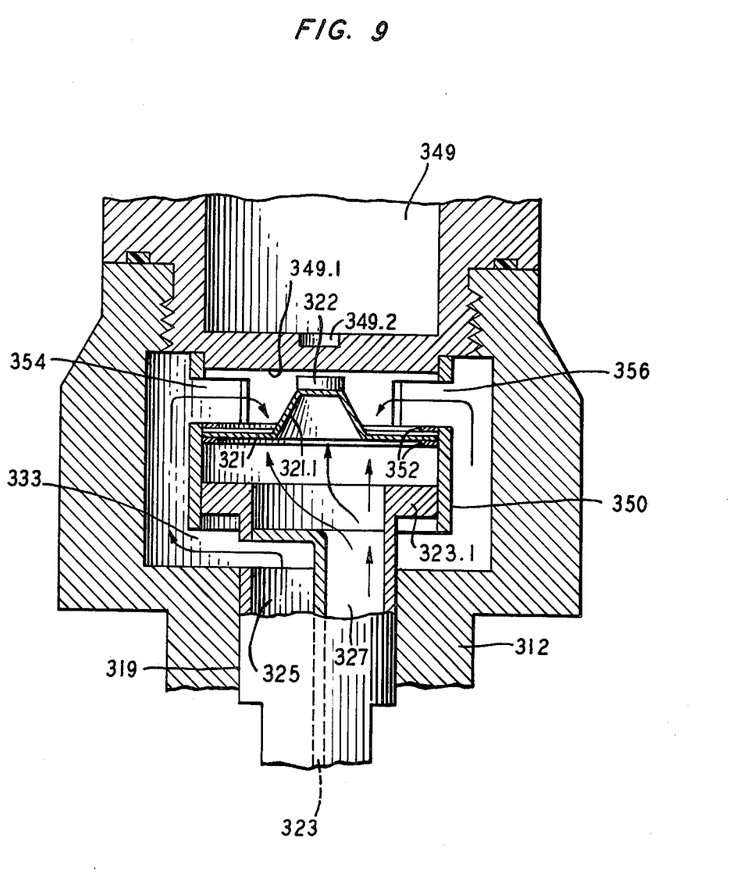
FIG. 9 is cut-away cross-sectional view of a flowmeter in accordance with another embodiment of my invention employing a vibratorily mounted disc as the sensor.

As mentioned previously, the substantially planar vibratory sensor may take the form of not only a flexible diaphragm rigidly mounted along its periphery but also a rigid disc vibratorily mounted along its periphery. An exemplary embodiment of the latter sensor assembly is shown in FIG. 9. A bifurcated cylindrical housing 319 is disposed within a bluff body support. Housing 319 is similar to housing 19 of FIGS. 3–6 in that it includes an L-shaped partition 323 which bifurcates its interior into a pair of channels 325 and 327 which are in fluid flow communication with separate ones of the orifices previously described as being in the downstream surfaces of a Rodely bluff body. As with the diaphragm arrangement, a substantially planar vibratory sensor in the form of rigid disc 321 is mounted at one end of housing 319. In contrast to the diaphragm arrangement, however, the disc 321 is not mounted directly on housing 319. Rather it is loosely carried between a pair of spaced, parallel retaining rings 352 which are mounted on the interior surface of a cylindrical support member 350. Member 350 fits snuggly, but removeably, over a flange 323 on one end of housing 319 and over boss 349.1 which protrude from head cap 349. In addition, member 350 has a pair of apertures 354 and 356 above disc 321 which places the upper surface of disc 321 in fluid flow communication with channel 325 via aperture 333 in the wall of housing 319. The lower surface of disc 321 is in fluid flow communication with channel 327.

In the illustrative embodiment shown, the disc has a raised central portion 321.1 on which a ferromagnetic member 322 is mounted. The sensitive portion of a magnetic detector (not shown) is positioned in recess 349.2 so that it is as close to the member 322 as is practical.

The operation of the rigid disc embodiment of FIG. 9 is substantially identical to the flexible diaphragm embodiment in that pressure fluctuations on opposite downstream surfaces of a Rodely bluff body are coupled through channel 327 to the lower surface of disc 321 and through channel 325 and apertures 333, 354 and 356 to the upper surface of disc 321. As a consequence, the disc 321 and ferromagnetic member 322 vibrate at a frequency related to flowrate thereby generating a proportional electrical signal in the magnetic detector.

What is claimed is:
1. A pressure fluctuation flowmeter comprising
a bluff body having a base surface facing fluid flow, a pair of converging surfaces extending downstream from said base surface and an orifice adjacent each downstream surface,
means defining a hollow interior,
means bifurcating said orifice and said interior to define a pair of channels in said interior in non-fluid communication with one another,
a substantially planar vibratory sensor having first and second opposite surfaces,
said channels having port means at a same end of said interior for admitting and withdrawing pressure fluctuations into said channels from said bifurcated orifice for communication in a same longitudinal direction toward said sensor, and
means vibratorily mounting said sensor with said first and second surfaces normal to said longitudinal direction and with said first surface communicating with a first one of said pair of channels and said second surface separately communicating with a second one of said pair of channels and thereby to cause said sensor to vibrate in response to pressure fluctuations in said channels.
2. The invention of claim 1 wherein
said first and second surfaces of said sensor comprise upper and lower surfaces thereof, and
said bifurcating means is L shaped for separately communicating admitted pressure fluctuations in said first one of said pair of channels to said upper sensor surface and admitted pressure fluctuations in said second one of said pair of channels to said lower sensor surface and thereby to cause said sensor to vibrate in response to said pressure fluctuations.
3. The invention of claim 1 further comprising
means for detecting vibrations of said sensor and including means in non-pressure-fluctuation communication with said pair of channels for sensing vibrations of said sensor in response to admitted pressure fluctuations in said pair of channels.
4. The invention of claim 3 wherein
said sensor comprises a ferromagnetic material, and
said sensing means comprises a magnetic detector.
5. The invention of claim 4 wherein
said sensor comprises a flexible diaphragm rigidly mounted along its periphery.
6. The invention of claim 4 wherein
said sensor comprises a rigid disc vibratorily mounted along its periphery.
7. The invention of claim 6 wherein
said disc includes a raised central portion and said material comprises a ferromagnetic member mounted on said raised portion.
8. A pressure fluctuation flowmeter comprising
a bluff body having a base surface facing fluid flow, a pair of converging surfaces extending downstream from said base surface and an orifice adjacent each downstream surface,
means defining a hollow inner chamber,
a sensor assembly for insertable mounting in said chamber and including
wall means having an exterior sealing a portion of said chamber and an inner segment defining a hollow interior,
means bifurcating said interior into a pair of channels, each of said channels having port means at a same end of said interior for admitting and withdrawing pressure fluctuations from separate ones of said orifices,
a substantially planar vibratory sensor having first and second opposite surfaces,
means providing an aperture between a first one of said channels and said hollow inner chamber, and
means mounting said sensor for communication of pressure fluctuations in said first one of said channels through said aperture, said hollow inner chamber with said first sensor surface and for separate communication of pressure fluctuation in a second one of said channels with said second sensor surface and thereby to vibrate said sensor in response to said communicating pressure fluctuations.
9. A vortex shedding flowmeter comprising
means for generating streets of pressure fluctuations in a fluid flow through a conduit comprising a bluff body having a base surface, a pair of converging surfaces extending downstream from said base surface, a pair of orifices adjacent said downstream surfaces, and said body having at one end thereof a cavity which extends inwardly along the long axis of said body and communicates with said pair of orifices in combination with a flow sensor assembly comprising
a vibratory sensor,
a sensor housing means removably disposed in said cavity,
said sensor housing means having a hollow interior bifurcated into separate channels and insertably disposed in said cavity,
means mounting said sensor in said housing means for communicating the fluid flow and pressure fluctuations of an individual one of the generated streets of pressure fluctuations from an individual one of said downstream surfaces through an individual one of said orifices and a first one of said channels individually to said first sensor surface and separately communicating the fluid flow and pressure fluctuations of another individual one of the generated streets of pressure fluctuations from another individual one of said downstream surfaces through another individual one of said orifices and a second one of said channels individually to said second sensor surface and thereby to cause said sensor to vibrate in response to the communicating fluid and pressure fluctuations and at a frequency related to the flowrate through said conduit, and
means in non-fluid-flow communication with said first and second channels for sensing vibrations of said sensor.

10. A vortex shedding flowmeter comprising
means for generating streets of pressure fluctuations in a fluid flow through a conduit comprising a bluff body having a base surface, a pair of converging surfaces extending downstream from said base surface and a pair of orifices adjacent said downstream surfaces, in combination with a flow sensor assembly comprising
means defining a hollow inner chamber;
means bifurcating said orifices and inner chamber into a pair of channels, each of said channels having port means at the same end of said inner chamber;
a substantially planar sensor having first and second opposite surfaces;
means mounting said sensor for cooperating with said bifurcating means for providing non-fluid-flow communication between said channels and for communicating the fluid flow and pressure fluctuations of an individual one of the generated streets of pressure fluctuations from an individual one of said downstream surfaces through an individual one of said orifices and a first one of said channels individually to said first sensor surface and separately communicating the fluid flow and pressure fluctuations from another individual one of said downstream surfaces through another one of said orifices and a second one of said channels individually to said second sensor surface and thereby to cause said sensor to vibrate in response to the communicating fluid and pressure fluctuations and at a frequency related to the flowrate through said conduit;
means in non-fluid-flow communication with said first and second channels for sensing vibrations of said sensor; and
wherein said sensor comprises a ferromagnetic material, and
said sensing means comprises a magnetic detector.

11. The invention of claim 10 wherein
said sensor comprises a flexible diaphragm rigidly mounted along its periphery.

12. The invention of claim 10 wherein
said sensor comprises a rigid disc vibratorily mounted along its periphery.

13. The invention of claim 12 wherein
said disc includes a raised central portion and said material comprises a ferromagnetic member mounted on said raised portion.

14. A flowmeter comprising
a bluff body having a base surface facing fluid flow, a pair of converging surfaces extending downstream from said base surface and a pair of orifices adjacent said downstream surfaces and in nonpressure communication with one another,
means defining a first hollow conduit,
means defining a second hollow conduit having a longitudinal portion thereof substantially parallel to and in nonpressure communication with said first conduit defining means,
a substantially planar vibratory sensor having first and second surfaces,
said first and second conduits having exterior ports substantially parallel to one another for admitting pressure fluctuations from said orifices into said conduits in the same direction toward said sensor, and
means mounting said sensor with said sensor surfaces substantially normal to said longitudinal portion of said second hollow conduit and for communicating pressure fluctuations in said first conduit with said first sensor surface and for separately communicating pressure fluctuations in said second conduit with said second sensor surface.

15. For use in a flowmeter including a bluff body having a base surface facing fluid flow, a pair of converging surfaces extending downstream from said base surface and a pair of orifices adjacent said downstream surfaces and further including a substantially planar vibratory sensor with first and second opposite surfaces mounted in a hollow inner chamber, the invention comprising means bifurcating said orifices and said inner chamber into two channels having longitudinal portions substantially parallel to each other and normal to said sensor surfaces and for admitting pressure fluctuations from said orifices into said channels in a same longitudinal direction toward one of said sensor surfaces, and means cooperating with said bifurcating means for communicating pressure fluctuations in a first one of said channels with said first sensor surface and for separately communicating pressure fluctuations in a second one of said channels with said second sensor surface.

16. Apparatus for measuring the flowrate of fluid in a conduit comprising
an elongated vortex shedding body spanning substantially the entire inner diameter of said conduit and having a base surface disposed substantially normal to the direction of fluid flow and a pair of downstream surfaces extending downstream from said base surface and meeting said base surface along a pair of edges, said base and downstream surfaces being mutually adapted so that the boundary layers of said fluid separate from said edges and so that vortex shedding is free of intermittency, and
means responsive to said vortex shedding for producing an electrical signal related to the flowrate of said fluid, CHARACTERIZED IN THAT said body has at one end thereof a cavity which extends inwardly along the long axis of said body and forms in each of said downstream surfaces an orifice, and said responsive means comprises a vibratory sensor, a sensor housing means removably disposed in said cavity and vibratorily housing said sensor, said sensor housing means having a hollow interior bifurcated into separate channels and insertably disposed in said cavity so that said channels are in fluid flow communication with separate ones of said downstream surface orifices,, said housing means having means defining an aperture which places a first one of said channels in fluid flow communication with one side of said sensor and a second one of said channels with an opposite second side of said sensor so that fluid flow in said conduit entering said orifices passes through said channels and thence to said opposite first and second sides of said sensor, and detector means responsive to the vibration of said sensor for producing said electrical signal.

17. Apparatus for measuring the flowrate of fluid in a conduit comprising an elongated vortex shedding body spanning substantially the entire inner diameter of said conduit and having a base surface disposed substantially normal to the direction of fluid flow and a pair of downstream surfaces extending downstream from said base surface and meeting said base surface along a pair of edges, said base and downstream surfaces being mutually adapted so that the boundary layers of said fluid separate from said body at said edges and so that vortex shedding is free of intermittency, and means responsive to said vortex shedding for producing an electrical signal related to the flowrate of said fluid, CHARACTERIZED IN THAT said body includes a support member at one end thereof for mounting said body in said conduit, said support member having a sensor chamber therein, said responsive means includes a substantially planar vibratory sensor disposed within said chamber, and detector means exterior to said chamber but proximate thereto for producing said electrical signal when said sensor vibrates, said body having a pair of orifices, each of said orifices located in an individual one of said downstream surfaces near to said one end, and means disposed within said member forming a pair of channels in non-fluid-flow communication with one another, said channels connecting said orifices in fluid flow communication with opposite sides of said sensor, thereby to cause said sensor to vibrate in response to said vortex shedding, said forming means comprising a cylindrical housing having a hollow interior, said sensor being mounted at one end of said housing, a partition within said housing which bifurcates said interior and forms said pair of channels so that only one said channel is in fluid flow communication with the side of said sensor interior to said housing, said housing having a first aperture which places the other of said channels in fluid flow communication with said chamber and the side of said sensor exterior to said housing.

18. The apparatus of claim 17 wherein said sensor comprises a flexible diaphragm rigidly mounted along its periphery on said one end of said housing.

19. The apparatus of claim 17 wherein said sensor comprises a rigid disc vibratorily mounted along its periphery at said one end of said housing.

20. The apparatus of claim 19 further including a hollow cylindrical member disposed snuggly over said one end of said housing, and wherein said disc is vibratorily mounted within said member, said member having at least one aperture above said disc in fluid flow communication with said first aperture.

21. The apparatus of claim 20 wherein said disc has a raised central portion and a ferromagnetic member mounted on said raised portion.

22. The apparatus of claim 17 wherein said vortex shedding body has a cavity in one end face thereof which is in fluid flow communication with said orifices, the other end of said housing being removably situated in said cavity, said housing having at said other end second and third apertures in substantial registration with said orifices.

23. The apparatus of claim 22 wherein said support member comprises a cylindrical first portion connected to said body and having a bore therein, said housing being removably situated in said bore, said first portion being insertable through a hole in the wall of said conduit, a cylindrical second portion adjacent said first portion and having a larger diameter than said first portion, said second portion being situated exterior to said conduit, said sensor chamber being located in at least said second portion, a removable head cap engaging said second portion and arranged so that when removed said sensor is exposed, said head cap having said detection means incorporated therein.

24. The apparatus of claim 23 wherein said sensor comprises a ferromagnetic material, and said detector means comprises a magnetic detector.

25. The apparatus of claim 22 wherein said partition is L-shaped with the foot of the L affixed near to said sensor so that said first aperture and the other of said channels are separated from the side of said sensor interior to said housing, and the leg of the L extending parallel to the walls of the housing and extending flush with said other end of said housing and abutting the bottom of said cavity of said vortex shedding body.

26. The apparatus of claim 25 wherein said cavity is formed in said body by a bore which extends through said downstream surfaces to form said orifices of rectangular shape and said second and third apertures are rectangular cut-outs in said other end of said housing.

27. Apparatus for measuring the flowrate of steam in a conduit comprising an elongated vortex shedding body having a planar base surface disposed substantially normal to the direction of fluid flow and a pair of downstream surfaces extending downstream from said base surface and meeting said base surface along a pair of edges, said base and downstream surfaces being mutually adapted so that the boundary layers of said fluid separate from said body at said edges and so that vortex shedding is free of intermittency, and means responsive to said vortex shedding for producing an electrical signal related to the flowrate of said fluid, CHARACTERIZED IN THAT, said body has at one end thereof a cavity which extends inwardly along the long axis of said body and forms in each of said downstream surfaces an orifice, said responsive means comprises a support member for mounting said one end of said body in said conduit, said member including a sensor chamber, a substantially planar vibratory sensor, a sensor housing having said sensor mounted at one end thereof which is disposed in said chamber, said sensor housing having a hollow interior bifurcated into separate channels in non-fluid-flow communication with one another and opening to the other end of said housing, said housing having said other end thereof disposed in said cavity of said body so that said channels are in fluid flow communication with separate ones of said orifices, said housing having therein an aperture which places one of said channels in fluid flow communication with said chamber so that fluid in said conduit entering said orifices passes through said channels and thence to opposite sides of said sensor, and detector means responsive to the vibration of said sensor for producing said electrical signal.

28. The apparatus of claim 27 wherein said body is oriented vertically in said conduit with said chamber at the top and said channels oriented vertically to facilitate drainage of condensed steam therefrom.

29. The apparatus of claim 27 wherein
said sensor comprises a ferromagnetic material, and
said detector means comprises a magnetic detector.

30. The apparatus of claim 29 wherein
said sensor comprises a flexible diaphragm rigidly mounted along its periphery on said one end of said housing.

31. The apparatus of claim 29 wherein
said sensor comprises a rigid disc vibratorily mounted along its periphery at said one end of said housing.

32. The apparatus of claim 31 further including a hollow cylindrical member disposed snuggly over said one end of said housing, and wherein said disc is vibratorily mounted within said member, said member having at least one aperture above said disc in fluid flow communication with said housing aperture.

33. The apparatus of claim 32 wherein
said disc has a raised central portion and said material comprises a ferromagnetic member mounted on said raised portion.

34. The apparatus of claim 32 wherein
said hollow member includes a pair of spaced parallel rings affixed to the interior surface thereof, said disc being loosely disposed between said rings.

35. Apparatus for measuring the flowrate of steam in a conduit comprising
an elongated vortex shedding body having a planar base surface disposed substantially normal to the direction of fluid flow and a pair of downstream planar surfaces extending downstream from said base surface and meeting said base surface along a pair of edges, said base and downstream surfaces being mutually adapted so that the boundary layers of fluid separate from said body at said edges and so that vortex shedding is free of intermittency, and means responsive to said vortex shedding for producing an electrical signal related to the flowrate of said fluid, CHARACTERIZED IN THAT, said body includes a support member at one end thereof for mounting said body in said conduit, said support member comprising a cylindrical portion connected to said body and having a bore therein and being insertable through a hole in the wall of said conduit, a sensor chamber located in said portion, a removable head cap engaging said portion and arranged so that when removed said chamber is exposed, said responsive means includes a ferromagnetic substantially planar vibratory sensor disposed within said chamber and a magnetic detector incorporated in said head cap, said body has a cavity in one end face thereof and a pair of rectangular orifices located in said downstream surfaces and in fluid flow communication with said cavity, and means disposed within said support member forming a pair of channels in non-fluid-flow communication with one another, said channels connecting said orifices in fluid flow communication with opposite sides of said sensor, thereby to cause said sensor to vibrate in response to said vortex shedding, said forming means comprising a cylindrical housing having a hollow interior, said housing being situated in said bore of said portion of said support member, said sensor being mounted at one end of said housing, the other end of said housing being removably situated in said cavity and having a pair of rectangular cut-outs in substantial registration with said rectangular orifices of said body, an L-shaped partition within said housing which bifurcates said interior and forms said pair of channels, said housing having a first aperture near to said sensor which places one of said channels in fluid-flow communication with said chamber and the side of said sensor exterior to said housing, the foot of said L-shaped partition being affixed near to said sensor so that said first aperture and said one channel are separated from the side of said sensor interior to said housing, the leg of said L-shaped partition extending parallel to the walls of said housing and extending flush with said other end of said housing and abutting the bottom of said cavity.

36. The apparatus of claim 35 wherein
said sensor comprises a flexible diaphragm rigidly mounted along its periphery on said one end of said housing.

37. The apparatus of claim 35 including
a hollow cylindrical member disposed snuggly over said one end of said housing,
a pair of spaced parallel rings affixed to the interior surface of said member, and wherein
said sensor comprises a rigid disc loosely disposed between said rings to permit vibration thereof,
said member having at least one aperture above said disc in fluid-flow communication with said first aperture of said housing, said disc having a raised central portion, and further including a ferromagnetic member mounted on said raised portion.

38. Pressure fluctuation sensor means comprising means defining a hollow inner chamber, a sensor assembly for insertable mounting in said chamber and including wall means having an exterior sealing a portion of said chamber and an inner segment defining a hollow interior, means bifurcating said interior into a pair of channels, each of said channels having port means at a same end of said interior for admitting and withdrawing pressure fluctuations therethrough, a substantially planar vibratory sensor having first and second opposite surfaces, means providing an aperture between a first one of said channels and said hollow inner chamber, and means mounting said sensor for communication of pressure fluctuations in said first one of said channels through said aperture, said hollow inner chamber with said first sensor surface and for separate communication of pressure fluctuation in a second one of said channels with said second sensor surface and thereby to vibrate said sensor in response to said communicating pressure fluctuations.

39. Apparatus for measuring the flowrate of fluid in a conduit, comprising a sensor assembly responding to pressure fluctuations of the fluid for producing an electrical signal related to the flowrate of the fluid, said sensor assembly including a vibratory sensor and two partially in parallel extending hollow conduits in non-fluid-flow communication with one another and for receiving and guiding of pressure fluctuations of the fluid, wherein a first surface of said sensor is applied by pressure fluctuations in the first conduit and a second surface of said sensor is applied by pressure fluctuations in the second conduit, CHARACTERIZED IN THAT an elongated vortex shedding body (11) is provided for producing the pressure fluctuations, said vortex shedding body spanning substantially the entire inner diameter of said conduit (1) and including a pair of orifices (41, 43) adjacent its downstream surfaces (15, 17), said orifices (41, 43) each communicated with one of said two conduits (208, 209 and 25, 27, respectively), and further characterized in that said sensor (204 and 21, respectively) is mounted with its surfaces (205, 206) substantially normal to a longitudinal portion of the second conduit (209 and 27, respectively).

40. Apparatus according to claim 39, CHARACTERIZED IN THAT the vortex shedding body (11) has a base surface (6) disposed substantially normal to the direction of fluid flow and a pair of downstream surfaces (15, 17) extending downstream from the base surface (6) and forming with the base surface (6) a pair of edges (9, 10), wherein the base surface (6) and the downstream surfaces (15, 17) are mutually adapted so that boundary layers of the fluid separate and vortex shed from the body (11) at the edges (9, 10) in order to produce the vortex shedding free of intermittency.

* * * * *